Figure 1:
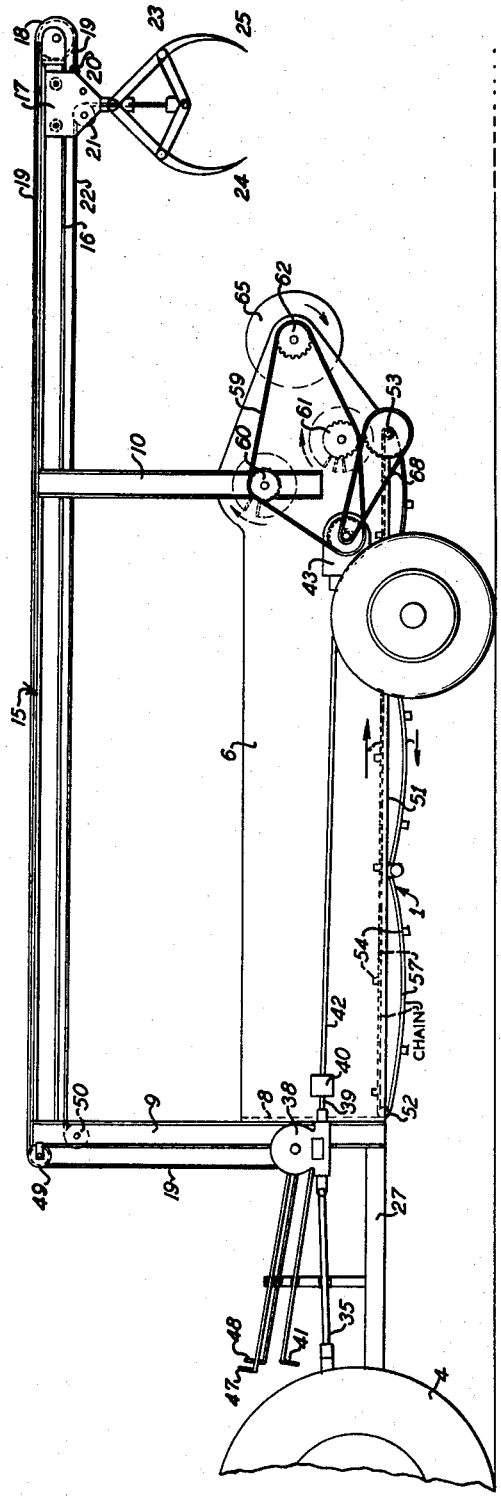

Nov. 8, 1960     C. VAN DER LELY ET AL     2,959,421
VEHICLE FOR CONVEYING AND SPREADING MANURE
Filed April 4, 1956     3 Sheets-Sheet 1

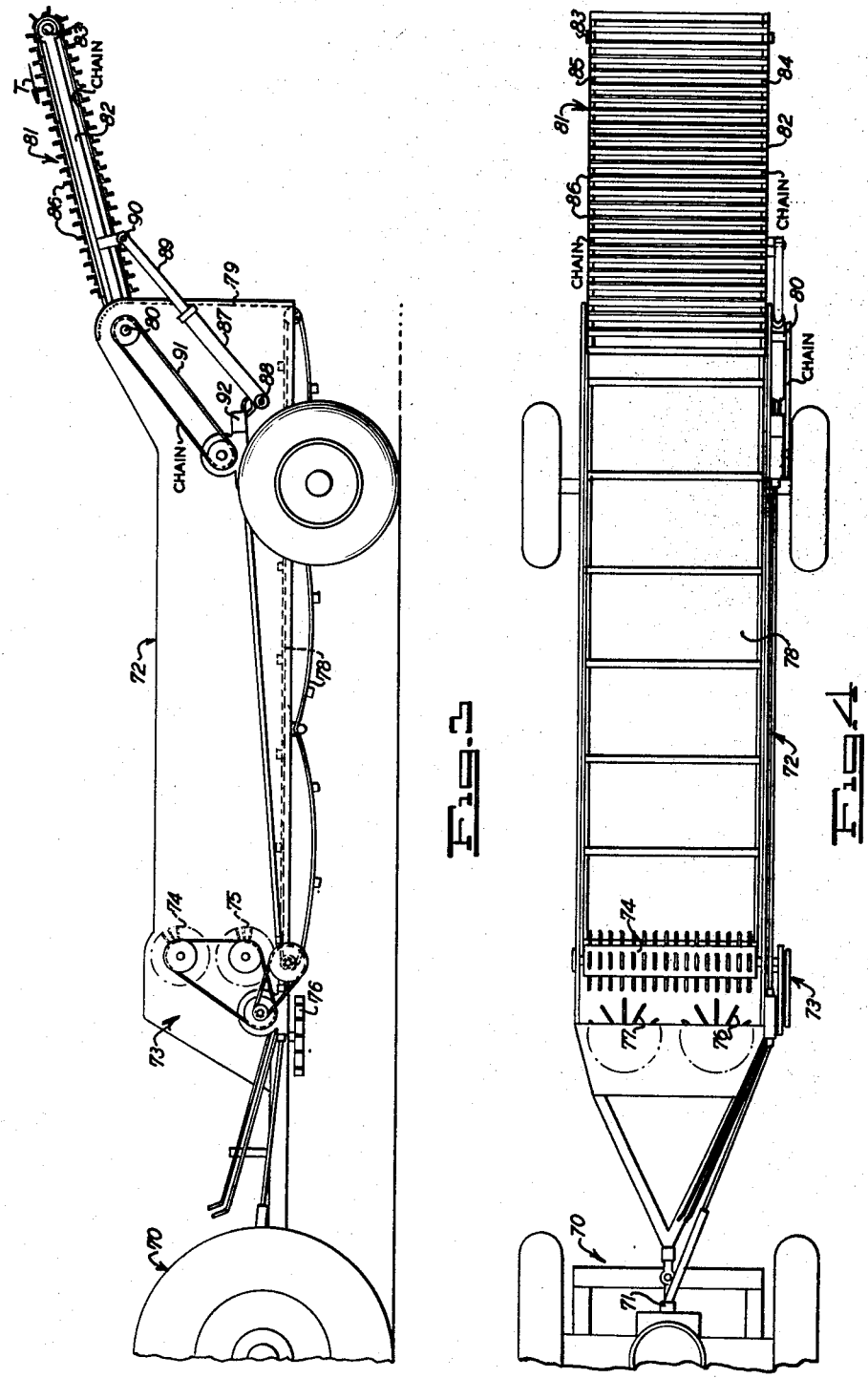

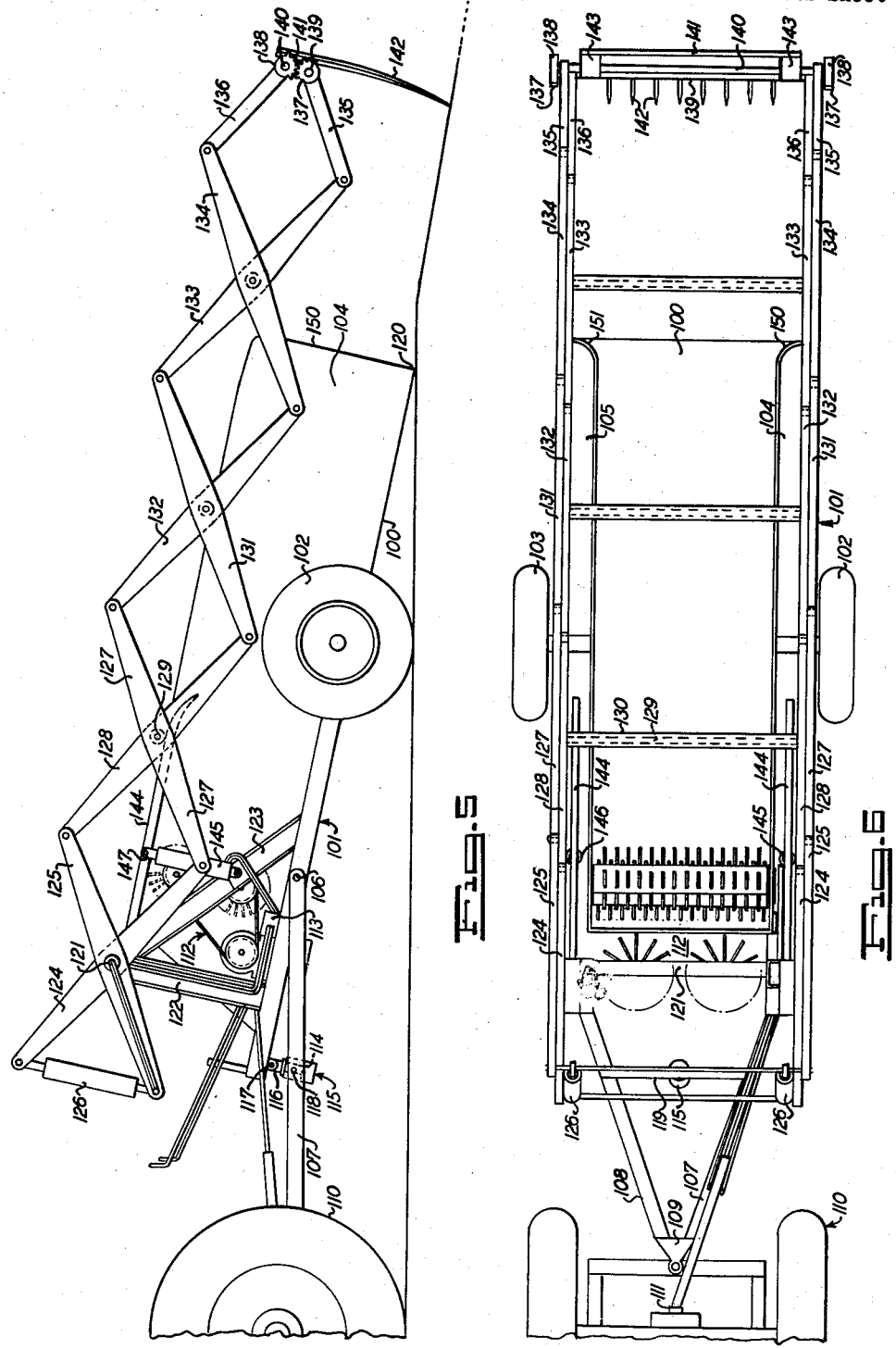

United States Patent Office 2,959,421
Patented Nov. 8, 1960

2,959,421
VEHICLE FOR CONVEYING AND SPREADING MANURE

Cornelis van der Lely and Ary van der Lely, Maasland, Netherlands, assignors to said Cornelis van der Lely, Maasland, Netherlands Filed Apr. 4, 1956, Ser. No. 576,113

Claims priority, application Netherlands Apr. 19, 1955

5 Claims. (Cl. 275—1)

The invention relates to a vehicle provided with a container for solid manure and a device for spreading said manure over the land. Vehicles of this kind being mostly carried out as a trailer for a tractor are generally known. The use of the spreading device saves manual labour, whereas an even distribution of the manure over the land can be obtained with it.

It is an object of the present invention to cause a vehicle of this kind which per se is already very useful to be still more advantageous in use by arranging the vehicle in such a way that the manure being practically continually mixed with straw can be put into the vehicle in a simple and easy manner, owing to which the work and consequently the expense being attended with the loading on the container of the vehicle, can be reduced. According to the invention the vehicle is also provided with a loading device for putting manure into the container.

Figure 2:
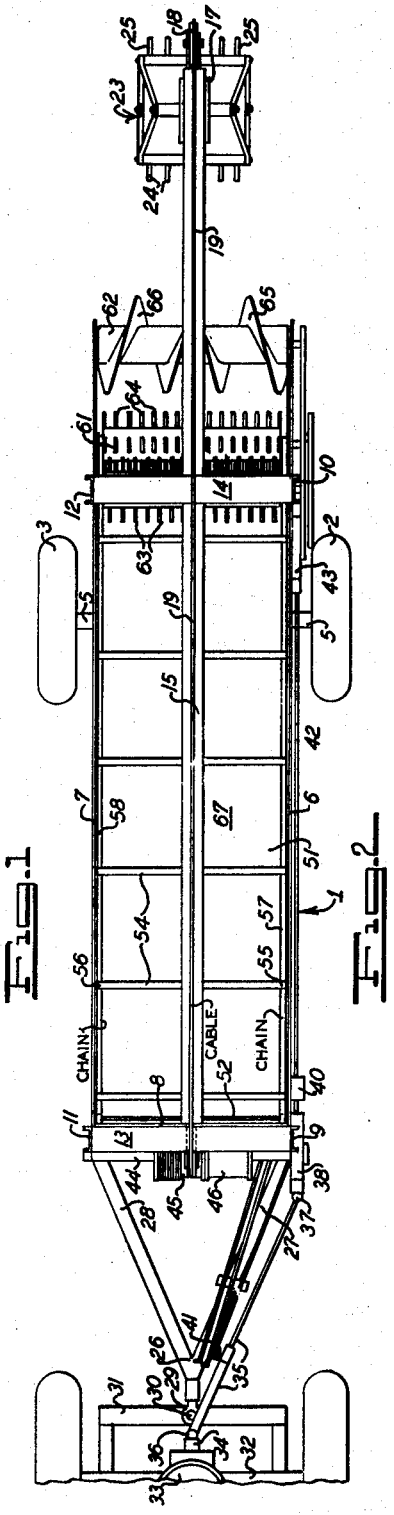

Other and further objects of the invention will become apparent from a reading of the following specification taken in conjunction with the drawing in which:

Fig. 1 shows a side elevation of a first embodiment of a vehicle according to the invention, Fig. 2 is a plan elevation of the vehicle according to Fig. 1, Fig. 3 is a side elevation of a second embodiment of a vehicle according to the invention, Fig. 4 represents a plan elevation of the vehicle according to Fig. 3, Fig. 5 shows a side-delivery rake of a third embodiment of the vehicle according to the invention, Fig. 6 shows a side elevation of the vehicle according to Fig. 5.

The vehicle shown in Figs. 1 and 2, designated as a whole by 1 is a trailer resting on two wheels 2 and 3 and attached during operation behind a tractor designated as a whole by 4, which trailer can be pulled forward by that. The axle 5 on which the wheels 2 and 3 are mounted supports two long side walls 6 and 7 of the vehicle 1. At the front said walls 6 and 7 are connected by means of a cross wall 8. The wall 6 carries two vertical beams 9 and 10 and the wall 7 carries two vertical beams 11 and 12, the beams 9 and 10 being connected by means of a horizontal cross beam 13 and the beams 10 and 12 by means of a horizontal cross beam 14. The central parts of the beams 13 and 14 carry a long beam 15 having a lower flange 16 over which a crab 17 can roll. The hindmost extremity of the beam 15 is provided with a freely rotatable disc 18 over which is led a cable 19, an end of which is attached to the crab 17 in 20. The crab is provided with a freely rotatable disc 21 over which a cable 22 is led. A gripping device 23 arranged for being attended by means of one cable is suspended by the downward extending extremity of the cable 22, said gripping device being provided with two systems of tines 24 and 25 and having a well-known construction.

The side walls 6 and 7 carry two beams 27 and 28 meeting each other at the front of the vehicle in a point 26. An eye 29 is fixed to the vehicle in the point 26, by means of which eye the vehicle can be connected to a pin 30 on a beam 31 of the tractor 4. The seat 33 for the driver of the tractor 4 is located above the rear bridge 32 of the tractor. In a well-known way the tractor 4 is provided in 34 with a power-take-off which, if the driver desires so, can be driven by the motor of the tractor 4. The fore-part of a telescopic axle 35 is coupled via a universal joint 36 to said power-take-off. The rear end of the axle 35 is coupled via a universal joint 37 to a reversing clutch incorporated into a casing 38, the axle 39 being driven via said reversing clutch. The axle 39 can be coupled to an axle 42 by means of a coupling 40 which can be connected and disconnected by means of a crank 41 attendable from the seat of the driven 33, the rear end of said axle 42 extending into a toothed wheel box 43 attached against the exterior of the wall 6. The axle 39 drives slowly an axle 44 by means of the transmission incorporated into the casing 38, on which axle 44 are mounted two drums 45 and 46. Normally said drums are not coupled to the axle 44, but they are locked in a known manner against rotating with regard to the vehicle 1. By attending a crank 47 or 48, respectively, the driver of the tractor 4 can couple the drums 45 and 46 conjointly or the drum 46 separately, respectively, to the axle 44 and he can discontinue the locking of the drums 45 and 46 or of the drum 46, respectively, with regard to the vehicle 1. At the front of the beam 15 the cable 19 is led over a disc 49 and fixed to the drum 45, whereas at the front of the beam 15 the cable 22 is led over a disc 50 and attached to the drum 46. In the drawn position of the crab 17 a piece of the cable 19 having the same length as the beam 15 is wound up the drum 45.

The walls 6, 7 and 8 enclose a space which is limited at their lower side by a bottom 51 over which the upper half of an endless conveyor can displace itself. Said conveyor comprises two chains which at the front and at the rear end are led over rolls 52 and 53 the first one of which is freely rotatable and the latter can be driven by the axle 42 by means of the toothed wheel box 43 and a chain working 68. The chains 57 and 58 are interconnected at regular intervals by means of bars 54, the ends of which are fixed to chain irons, like 55 and 56 of the chains 57 and 58. By means of a chain 59 and the toothed wheel box 43 the axle 42 can set in motion three axles 60, 61 and 62 having their ends supported in the walls 6 and 7. Each of the axles 60 and 61 carries a number of blades 63 and 64 serving as distribution members for the manure, and the axle 62 carries distribution members 65 and 66 seeing to the lateral distribution of the manure. The axles 60, 61 and 62 constitute together a manure spreading device of a well-known principle.

The device according to Figs. 1 and 2 is used as follows. The vehicle 1 is arranged in such a way that the gripping device 23 is situated above a quantity of manure lying e.g. on the ground. By causing afterwards the power-take-off 34 to rotate and by controlling the crank 48 the driver of the tractor 4 eases off the cable 22, due to which the opened gripping device 23 comes down on the manure and seizes a quantity of it which is lifted by the gripping device 23 after changing over the reversing clutch in the casing 38 to the other direction of rotation. As soon as the gripping device will have reached a sufficient height for not striking against the axle 60, the vertical movement of the gripping device 13 is caused to pull up. By attending the crank 47 the cable 19 is veered and the cable 22 is wound on the drum 46 at the same time. In this case the gripping device 23 maintains the same height, but displaces itself forward conjointly with the crab 17. Only the cable 22 is controlled above the space between the walls 6 and 7 which space constitutes a container 67 for the manure and the driver drops the manure after which the gripping device when being empty is displaced rearward and all will repeat till the container 67 will be entirely filled with manure. Next one drives the vehicle to the land where the manure is to be spread. There the coupling 40 is put in gear by means of the crank 41 and the reversing clutch in the casing 38 is adjusted in such a way that the roll 53 and the axles 60, 61 and 62 viewed in Fig. 1 rotate clockwise. The bars 54 convey the whole contents of the container slowly rearwards to the spreading device which spreads immediately the quantity supplied in this way.

The embodiment of the vehicle according to the invention shown in Figs. 3 and 4 is attached behind a tractor and pulled forward by it in the same way as the one according to Figs. 1 and 2. Said tractor 70 comprises a power-take-off 71 which can drive a spreading device 73 provided on the vehicle 72. Contrary to the arrangement shown in Figs. 1 and 2 the spreading device is located at the front of the container of the vehicle 72. The device 73 comprises rotating rolls 74 and 75 which can see to the distribution of the manure, whereas the proper distribution takes place by means of two horizontal rotating blade wheels 76 and 77. An endless conveyor 78 can move over the bottom of the container as well as in the device already described with reference to Figs. 1 and 2, which endless conveyor 78 can be driven by means of the power-take-off 71 for advancing the manure to the device 73, but also in the opposite direction, i.e. rearwards. The container of the vehicle 72 comprises a releasable rear wall 79 above which is located a loading conveyor 81 being rotatable about an axle 80. Said loading conveyor consists of a frame 82 rotatable about the axle 80, said frame 82 supporting freely rotatably an axle 83. Chains 84 and 85 pass around wheels on the axles 80 and 83, a plurality of bars 86 carried out as scrapers being mounted on said chains for constituting a conveyor belt. By means of an oil pressure cylinder 87 being hingedly attached to the vehicle in 88, whereas the plunger 89 is hingedly attached in 90 to the frame 82 of the loading conveyor 81, the frame 82 can be placed in all sorts of positions. The power-take-off 71 of the tractor 70 can drive the axle 80 amongst other things via a chain working 91 and by that it can move the conveyor belt in the direction of the arrow T, whereas an oil pump 92 is driven at the same time. According to his wishes the attending person can admit the oil displaced by said pump to the cylinder 87 or he can permit oil to run out of said cylinder.

The use of said device is as follows. The vehicle 72 is arranged in such a way that the axle 83 is situated above a heap of manure; then the driver drops the conveyor moving according to the arrow T. The conveyor takes the manure along with it and drops it on the belt 78. If the layer of manure accumulated on the belt increases too much, the belt 78 is moved forward for a small distance. At last the container is entirely filled. The device can also be used when having the axle 83 at a small height above the ground. In that case the vehicle is driven slowly rearwards for loading a heap of manure on the vehicle. In this case too the loading occurs very quickly and simply.

The spreading can happen in two ways. First of all the spreading device 73 placed at the front of the vehicle can be used, in which case the conveyor 78 is moved forward. Secondly the loading conveyor 81 can be used, however, as a spreading device, in which case the rear wall 79 is removed, the conveyor 78 is caused to back and the loading conveyor 81 is let down so far that only a narrow cleft is left between the rear portion of the vehicle and the loading conveyor 81. The loading conveyor is caused to run in the direction T, owing to which the manure supplied slowly by means of the conveyor 78 will immediately be divided into small parts which fall on the ground while being spread over a strip of land having the same width as the vehicle.

In the embodiment of the invention shown in Figs. 5 and 6, the vehicle comprises a container 101 provided with a stiff and smooth bottom 100 which is fixedly mounted. The container 101 is supported by means of wheels 102 and 103 near the central part of the side walls 104 and 105. The front of the container 101 is provided with two beams 107 and 108 connected hingedly about an axle 106, which beams are rigidly connected to each other by element 109 which can be coupled to a tractor 110. The tractor 110 has a power-take-off which drives independently a spreading device 112 and an oil pump 113 as has been previously described. The spreading device is located at the front of the container 101. The driver of the tractor can admit the pressure oil supplied by the pump 113 into a cylinder 115 to control a piston 114, while the piston 114 is hingedly fixed to the container 101 by pivot 117 and a piston rod 116 and the cylinder 115 is hingedly attached by pivot 118 to a bar 119 connecting the beams 107 and 108. Consequently the container 101 can be arranged at different gradients. During spreading the tank is arranged substantially horizontally, but during the loading of manure the rear edge 120 of the bottom 100 of the container 101 rests upon the ground.

At the front of the container 101, an axle 121 is mounted by means of supporting bars 122 and 123, whereas two legs 124 and 125 of a lazy tong arrangement are mounted rotatably about the ends of said axle 121 on both sides of the container 101. The fore ends of said legs are forced apart by means of two devices 126 operated by oil pressure. The rear ends of the legs 124 and 125 are hingedly attached to the fore-parts of legs 127 and 128. The legs 127 are interconnected rigidly by means of an axle 129 which is led through a tube 130 interconnecting the legs 128 rigidly. To legs 127 and 128 are connected elements 131 and 132 and to these elements are connected elements 133 and 134. At the end of the lazy tong arrangement thus composed, toothed sectors 137 and 138 are rigidly connected. The legs 135 and 136 are respectively connected by means of axles 139 and 140 to the sectors 137 and 138. An element 141 provided with tines 142 and capable of fitting exactly between the walls 104 and 105 carries bearings 143 in which axles 139 and 140 are rotatably supported.

Further, two guide bars 144, the fore-parts of which are rotatable about the axle 121, support the tube 130 and are vertically adjustable themselves by means of pressure cylinders 145 and 146 which are hingedly connected to the supporting bars 123 and the plungers of which are hingedly connected to the guide bars 144.

The use of said device is as follows. The operator admits oil to cylinders 145 and 146 due to which the bars 144 and consequently the lazy tong arrangement and the element 141 will be lifted. Then, the container 101 is driven backwards until the lower edge 120 of container 101 is sufficiently close to the manure to be loaded. By admitting oil to cylinder 115, the edge 120 is set on the ground. Next, sufficient oil is evacuated from the cylinder 145 to cause the element 141 to rest on the ground. Next, oil is admitted to the cylinder 126 so that the fore-parts of the legs 124 and 125 are forced apart due to which the lazy tongs are shortened. The fork 141 pushes the manure into the container 101, the side walls 104 and 105 of which are provided at its rear side with edges 150 and 151 for obtaining a widened, somewhat funnel shaped entrance. The manure is pushed toward the front of the container 101, while the tines 142 slide over the bottom of the container. The fork can be lifted again by raising the guide bars 144 and thus the tube 130. By shortening the device 126, the fork 142 can be moved rearwards and manure can be pushed anew into the container 101 till it is entirely filled. The element 141 is then placed above the edge 120 for serving as a rear wall during transport. During spreading the fork 141 is caused to advance slowly for supplying the contents of the container gradually to the spreading device 112.

What we claim is:

1. Apparatus comprising a mobile frame, a container pivotally connected to the frame in trailing relationship thereto, the container having a rearmost edge and being open at its rear, means secured to said frame and container for tilting the latter to bring said edge adjacent the ground, a lazy tong arrangement including a plurality of pivotally connected legs, said arrangement being pivoted at the front of said container and extendible through the open rear thereof, means on the container engaging the lazy tong arrangement for pivoting the same independently of the tilting of the container, a fork on the lazy tong arrangement for scraping material into the container, and means coupled to the lazy tong arrangement for extending and retracting the same and thereby moving the fork relative to said container.

2. Apparatus as claimed in claim 1 wherein the means coupled to the lazy tong arrangement and said fork are connected to opposite ends of the lazy tong arrangement.

3. Apparatus as claimed in claim 1 comprising a horizontal axle supported by the container, said arrangement being pivotally connected to said container by said axle.

4. Apparatus as claimed in claim 1 comprising a spreading device on the container at the front thereof and including drive means, the fork being displaceable between positions respectively outside of the container and adjacent said spreading device, the fork serving to load the container when the rearmost edge thereof is adjacent the ground and to convey material to the spreading device when the container is in generally horizontal position.

5. Apparatus as claimed in claim 1 wherein each of said means is a piston and cylinder arrangement.

References Cited in the file of this patent

UNITED STATES PATENTS

| | | |
|---|---|---|
| 1,346,433 | Varland | July 13, 1920 |
| 1,442,980 | Shedenhelm | Jan. 23, 1923 |
| 2,274,481 | Johnston | Feb. 24, 1942 |
| 2,334,323 | Gilbert | Nov. 16, 1943 |
| 2,660,439 | Scranton | Nov. 24, 1953 |
| 2,705,082 | Heimsoth | Mar. 29, 1955 |

FOREIGN PATENTS

| | | |
|---|---|---|
| 513,002 | Canada | May 17, 1955 |